United States Patent
Urano et al.

(10) Patent No.: US 7,360,424 B2
(45) Date of Patent: Apr. 22, 2008

(54) CAPACITANCE-TYPE LIQUID SENSOR

(75) Inventors: Mitsuhiro Urano, Aichi (JP); Takashi Toda, Aichi (JP); Eisaku Yokota, Aichi (JP)

(73) Assignee: Ubukata Industries, Co., Ltd., Nagoya Aichi (JP)

( * ) Notice: Subject to any disclaimer, the term of this patent is extended or adjusted under 35 U.S.C. 154(b) by 290 days.

(21) Appl. No.: 10/518,407

(22) PCT Filed: Jun. 16, 2003

(86) PCT No.: PCT/JP03/07633

§ 371 (c)(1),
(2), (4) Date: Jun. 14, 2005

(87) PCT Pub. No.: WO04/001334

PCT Pub. Date: Dec. 31, 2003

(65) Prior Publication Data

US 2005/0210979 A1 Sep. 29, 2005

(30) Foreign Application Priority Data

Jun. 20, 2002 (JP) ............................. 2002-179789
May 9, 2003 (JP) ............................. 2003-131731

(51) Int. Cl.
*G01P 15/02* (2006.01)
*G01P 15/125* (2006.01)
(52) U.S. Cl. ............................. 73/514.06; 73/514.09
(58) Field of Classification Search ............ 73/514.05, 73/514.06, 514.07, 514.08, 514.09, 514.1, 73/514.11, 514.12, 514.13
See application file for complete search history.

(56) References Cited

U.S. PATENT DOCUMENTS

| 5,052,223 A | * | 10/1991 | Regnault et al. | .......... 73/304 C |
| 5,802,728 A | * | 9/1998 | Karnick et al. | .......... 33/366.18 |
| 6,276,206 B1 | * | 8/2001 | Reime | .......... 73/514.09 |

FOREIGN PATENT DOCUMENTS

| JP | 5-172571 | 7/1993 |
| JP | 11-118412 | 4/1999 |
| JP | 2001-13160 | 1/2001 |
| JP | 2001-324513 | 11/2001 |
| JP | 2002-151353 | 5/2002 |

* cited by examiner

*Primary Examiner*—Helen Kwok
(74) *Attorney, Agent, or Firm*—Smith, Gambrell & Russell, LLP (57) ABSTRACT

A capacitance type liquid sensor is disclosed which detects a tilt angle and acceleration of an object using the fact that a liquid surface always keeps itself horizontal. Openings (13, 14) are formed in two sides of a hollow cylindrical closed container (6) made of an electrically insulating material, and the container has two parallel sides (2, 3). Plate-shaped main electrodes (4, 5) on at least one face of each of which silicon oxide film is formed are made to be in contact with the sides so as to close the openings, with the silicon oxide film being placed so as to face the inside of the container. A sealing agent (28) is interposed in a gap between the plate-shaped main electrodes and the sides. The container is filled with electrically conductive liquid (27) of an amount equal to substantially one-half of the inside volume of the container. An auxiliary electrode (8) brought into electrical contact with the conductive liquid is mounted in the container.

45 Claims, 11 Drawing Sheets

FIG.21 PRIOR ART

CAPACITANCE-TYPE LIQUID SENSOR

TECHNICAL FIELD

The present invention relates to a capacitance type liquid sensor which uses an electrically conductive liquid and is suitable for use as tilt sensors, acceleration sensors and seismoscopes.

BACKGROUND ART

A tilt sensor is used for measurement of a tilt angle of a measured object on which the tilt sensor is mounted, relative to a horizontal surface or a vertical axis of the object. On the other hand, an acceleration sensor and a seismoscope are used for measurement of acceleration received by an object on which the sensor is mounted. Since both types of sensors differ in an object to be measured, different sensors suitable for measurement of respective physical quantities are usually used selectively.

However, a liquid sensor using an electrically conductive liquid has conventionally been known as usable for measurement of both tilt angle and acceleration. The liquid sensor utilizes a principle that a liquid surface always keeps itself horizontal in a stationary state. When a container of the sensor containing the liquid therein tilts, an angle of the container relative to the liquid surface in the container is detected so that a tilt angle of the container is measured. Conversely, when a horizontal acceleration is applied to the sensor container disposed horizontally, the liquid surface is tilted in the container, so that a tilt angle of the liquid surface is detected, whereby applied acceleration is measured. In this specification, a sensor measuring a tilt angle or an acceleration using such a principle is referred to as "liquid sensor."

A resistance type and a capacitance type are known as a method or system of detecting a tilt angle between a surface of liquid contained in a container and the container.

Figure 20:
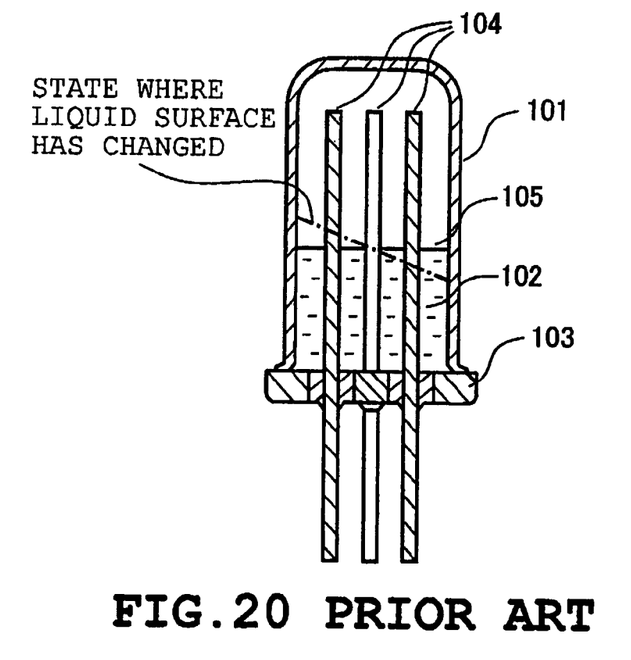
FIG. 20 is a longitudinal section of an example of resistance type liquid sensor in accordance with the prior art.

JP-A-2001-13160 discloses a technique pertaining to the resistance type, for example. In this sensor, as shown in the longitudinal section of FIG. 20, a suitable amount of electrically conductive liquid 102 is enclosed in a circular cylindrical metal container 101 having a closed end, and an opening is closed by a metal disc 103. One or two pairs of metal electrodes 104 extend through and are fixed in the disc 103 in an electrically insulated manner. When the container 101 tilts or a horizontal acceleration is applied to the container 101, an angle between the container 101 and a surface 105 of the liquid in the container is changed such that a contact area of the metal electrode 104 with the conductive liquid 102 is changed, whereupon an electrical resistance is changed between the metal container 101 and each metal electrode 104. Accordingly, changes in the resistance value are measured so that a tilt angle of the container 101 or a magnitude of acceleration is detected.

In the case of the resistance type liquid sensor, however, the metal electrodes are in direct contact with the conductive liquid (electrolytic solution) and accordingly, electric current for the measurement of resistance flows through a boundary therebetween. This results in a chemical change such as elution of metal composing the electrode or electrolysis of conductive liquid. As a result, there arises a problem that it is difficult to secure stability and reliability of the sensor for a long period of time.

On the other hand, JP-A-5-172571 discloses a technique pertaining to the capacitance type liquid sensor, for example.

Figure 21:
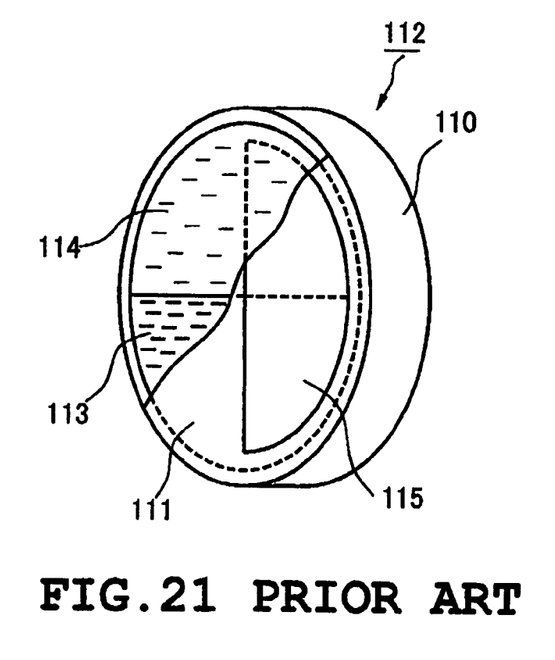
FIG. 21 is an example of capacitance type liquid sensor in accordance with the prior art.

As shown in FIG. 21, a container 112 includes a cylindrical frame 110 disposed horizontally and made from a conductive material. The frame 110 has both open ends closed by insulating plates 111. The container 112 is filled with a conductive liquid 113 whose amount corresponds to substantially one half of capacity of the container and an insulating liquid 114 having a smaller specific gravity than the conductive liquid 113. Arc outer electrodes 115 formed by dividing outer surfaces of a semicircular or circular shape are provided on outer surfaces of the insulating plates 111 respectively. When the container 113 tilts, a capacitor constituted by the both end insulating plates 111 sandwiched between an arc outer electrode 115 and conductive liquid 113 changes a capacitance thereof. An amount of change is measured so that a tilt of the container is detected.

In the capacitance type sensor, however, a usual insulating plate is used as a dielectric forming the capacitor. Since the insulating plate constitutes a part of the container 112, its thickness cannot be reduced so much. Accordingly, since it is difficult to render the capacitance of the capacitor larger and the detectivity is low, there arises a problem that it is difficult to increase the detection accuracy.

Further, JP-A-11-118412 discloses a displacement signal generating device of the capacitance type. The device includes a single electrode substance and two electrodes of respective dielectric structural bodies having the electrodes such as a chemically treated aluminum foil, all the electrodes being impregnated in an electrolyte contained in a container. Electric elements are electrically connected between the single electrode substance and the electrodes of the dielectric structural bodies. When the container filled with the electrolyte or each of the electrodes of the dielectric structural bodies is displaced, a contact area of each of the electrodes of the dielectric structural bodies with the electrolyte is changed such that a capacitance between the single electrode substance and each of the electrodes of the dielectric structural bodies is changed. The change in the capacitance is measured, whereby displacement is detected.

In the capacitance type sensor, however, the chemically treated aluminum foil is used as the electrodes of the dielectric structural bodies. A surface of aluminum foil is anodized so that an aluminum oxide coat serving as a dielectric is formed thereon. Since the chemically treated aluminum coat has a problem in the stability, it is difficult to secure the stability and reliability of the sensor for a long period of time.

DISCLOSURE OF THE INVENTION

The present invention was made to overcome the above-described problems in the prior art and an object thereof is to provide a capacitance type liquid sensor which can maintain the stability and reliability for a long period of time.

The object of the present invention is accomplished by providing a capacitance type liquid sensor comprising a cylindrical closed container made from an electrically insulating material and having two sides parallel to each other, the sides having respective openings formed therein, the container being filled with a conductive liquid, a plurality of plate-shaped main electrodes each having at least one side formed with a silicon oxide film, the main electrodes being in abutment with said sides while the silicon oxide films face an inside of the container, thereby closing the openings, a sealing agent interposed in a gap between the main electrodes and said sides for fluid tightness respectively, and an auxiliary electrode provided in the container to be brought into electrical contact with the conductive liquid, wherein the conductive liquid has an amount corresponding to substantially one half of a content volume of the container.

The liquid sensor having the above-described construction has an advantage of being able to maintain stability and reliability for a long period of time and to be manufactured into a miniature size since a very thin silicon oxide film superior in the electric and chemical stability is used as a dielectric forming a capacitor.

Further, the object of the present invention is also accomplished by providing a capacitance type liquid sensor comprising a closed container, an electrically conductive liquid having an amount equal to substantially one-half of an inside volume of the container and filling the container, a pair of lead terminals extending through one of ends of the container and fixed to the container so as to be electrically insulated from the container, a plurality of main electrodes having surfaces formed with silicon oxide films and mounted on distal ends of the lead terminals, respectively, the main electrodes being provided so that parts of the main electrodes are located on a liquid surface of the conductive liquid when the container is stationary, and an auxiliary electrode electrically conductively brought into contact with the conductive liquid.

The liquid sensor having the above-described construction also has the advantage of being able to maintain stability and reliability for a long period of time and to be manufactured into a miniature size since a very thin silicon oxide film superior in the electric and chemical stability is used as a dielectric forming a capacitor.

BEST MODE FOR CARRYING OUT THE INVENTION

The present invention will be described with reference to the accompanying drawings in order that the invention may be rendered clear in more detail.

First Embodiment

Figure 1:
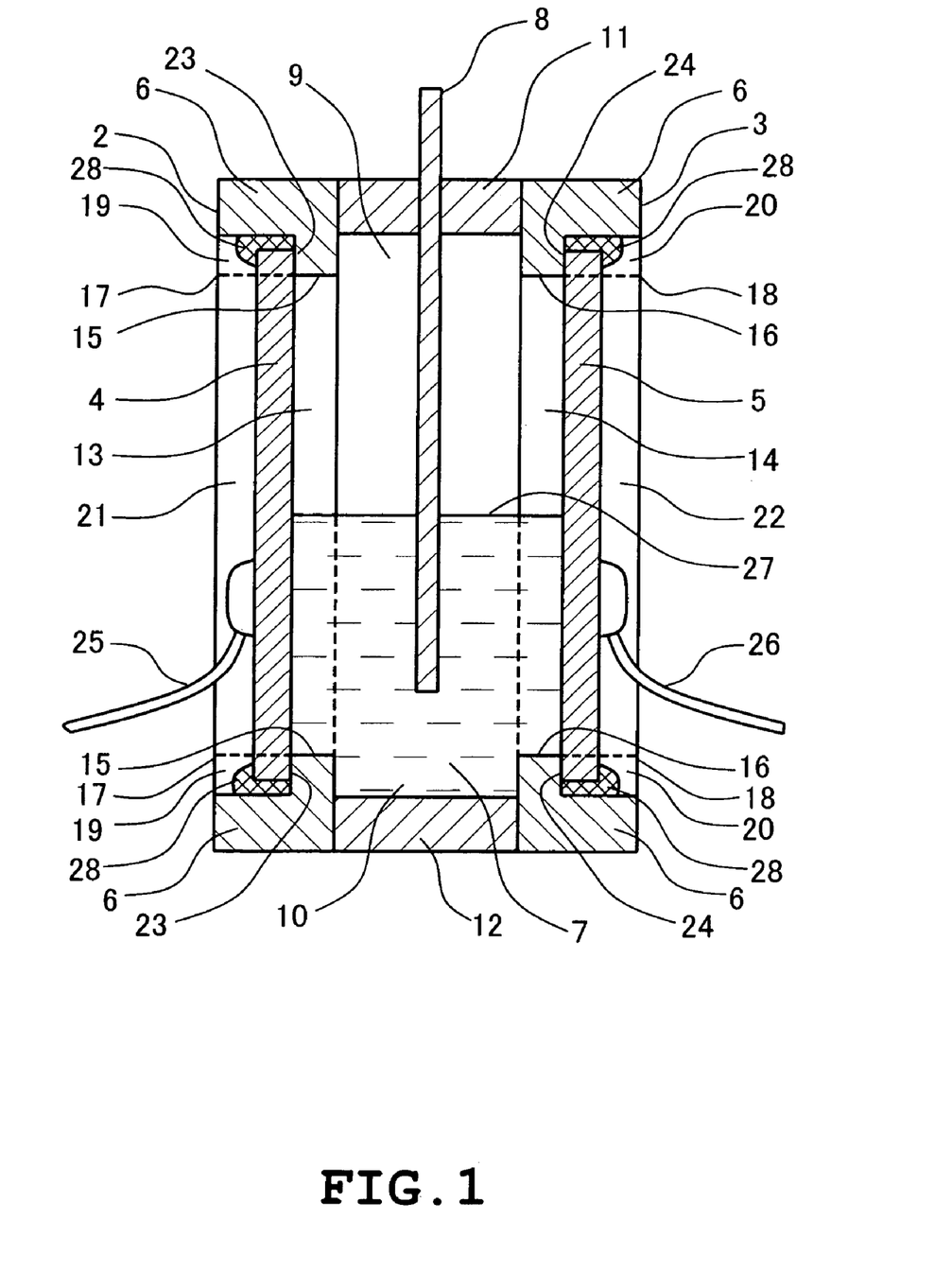
FIG. 1 is a longitudinal section of the liquid sensor in accordance with a first embodiment of the present invention.
Figure 2:
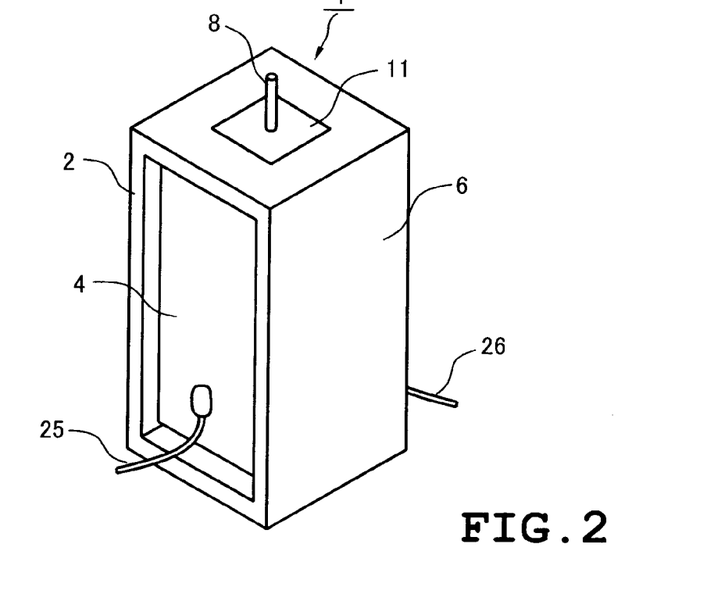
FIG. 2 is a perspective view of the liquid sensor in accordance with the first embodiment of the present invention.
Figure 3:
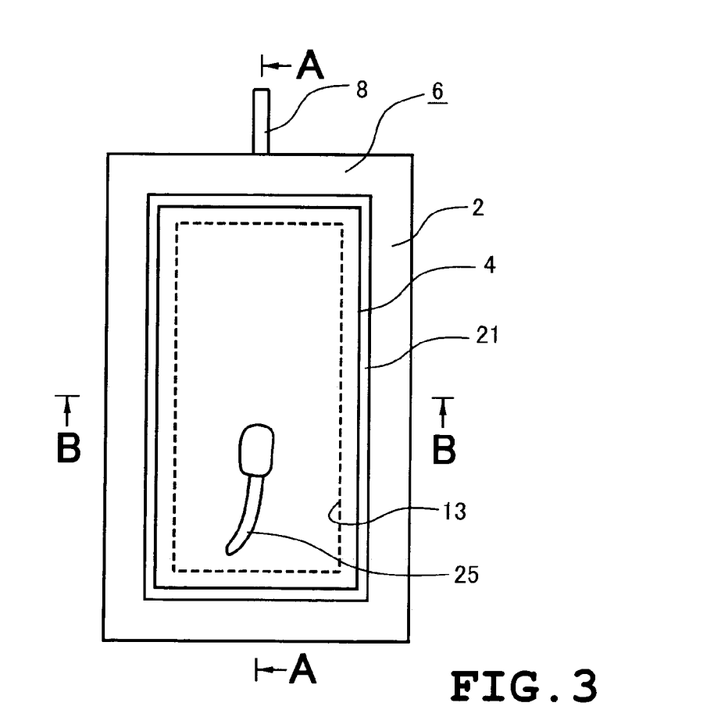
FIG. 3 is a front view of the liquid sensor in accordance with the first embodiment of the present invention.
Figure 4:
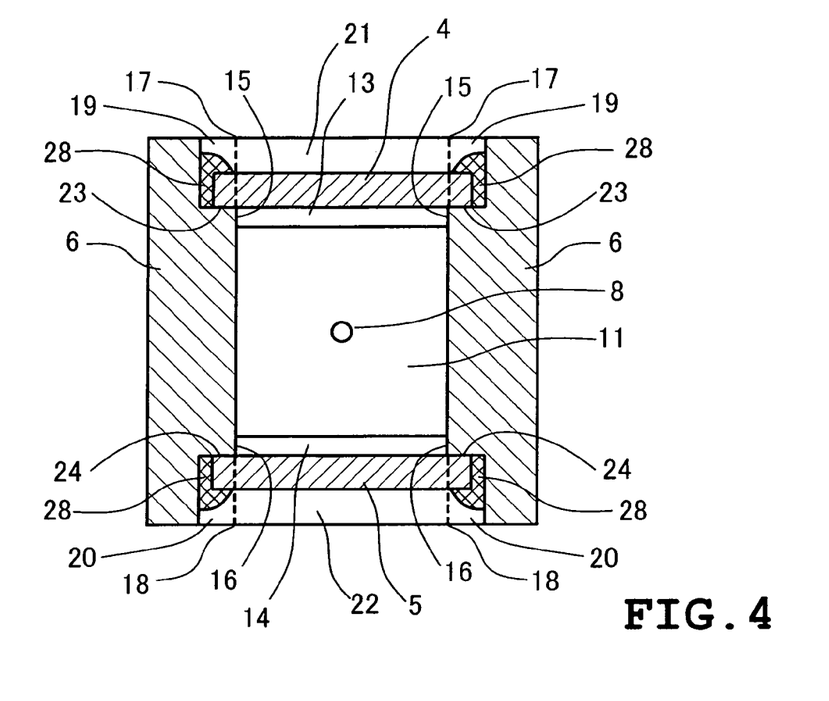
FIG. 4 is a transverse section of the liquid sensor in accordance with the first embodiment of the present invention.

A first embodiment of the present invention will be described with reference to the accompanying drawings. FIG. 2 is a perspective view of the liquid sensor of the embodiment, FIG. 3 is a front view thereof, FIG. 1 is a longitudinal section thereof (sectional view taken along line A-A), and FIG. 4 is a transverse section thereof (sectional view taken along line B-B).

The liquid sensor 1 of the embodiment has such a structure that openings 13 and 14 are provided in two parallel sides 2 and 3 of a cylindrical container 6 with both closed ends, plate-shaped main electrodes 4 and 5 having surfaces covered with silicon oxide films are fitted in the openings 13 and 14 thereby to close them, an interior of the container is filled with a suitable amount of conductive liquid 7, and a metal auxiliary electrode bar 8 is inserted through an upper lid 11 into the conductive liquid 7.

The container 7 is a cylindrical one and has two parallel sides 2 and 3. The sides are required to include two parallel faces and a transverse section need not be rectangular. Upper and lower openings 9 and 10 are closed by upper and lower lids 11 and 12 respectively. The cylindrical container 6 is made from an electrically insulating material such as ceramic, hard glass, synthetic resin, etc. with the upper and lower lids 11 and 12.

The parallel sides 2 and 3 are formed with vertically extending slender rectangular openings 13 and 14 respectively. Four end faces 15 and 16 defining the openings 13 and 14 have all the outer corners 17 and 18 cut out in the direction of extension of the end faces 15 and 16 so that the corners have rectangular sections, whereby notches 19 and 20 are formed so that plate-shaped members are fitted into the notches. As the result of formation of the notches 19 and 20, sectional areas of the openings 13 and 14 at the inside of the container are smaller than sectional areas of openings 21 and 22 at the outside of the container with a boundary at the middle in the direction of thickness of the sides 2 and 3.

The plate-shaped main electrodes 4 and 5 are fitted in the openings 21 and 22 respectively. The plate-shaped main electrodes 4 and 5 are each made of silicon (Si) and each have at least one side formed with a silicon oxide film on its entirety. The plate-shaped main electrodes 4 and 5 have areas larger than sectional areas of the openings 13 and 14 at the inside of the container and slightly smaller than sectional areas of the openings 21 and 22 at the outside of the container, respectively. The plate-shaped main electrodes 4 and 5 are fitted in the openings 21 and 22 so that the sides with the silicon oxide films abut against the bottoms 23 and 24 of the notches 19 and 20, respectively. Lead wires 25 and 26 for taking out the potential of the main electrodes are connected by a conductive paste, soldering or the like to electrode surface portions from which the silicon oxide film has been removed.

The silicon (Si) which is the material for the main electrodes 4 and 5 includes single crystal silicon, amorphous silicon, polycrystalline silicon, etc. Further, the silicon oxide film can be formed by an ordinary method used in the IC production process, such as the thermal oxidation process, CVD process or the like.

When the plate-shaped main electrodes 4 and 5 are fitted in the respective openings 21 and 22, gaps in abutting portions of the main electrodes 4 and 5 and the notches 19 and 20 are filled with a sealing agent 28 such as low-melting glass, synthetic resin bonding agent or the like. Further, gaps between the outer peripheral faces of the main electrodes 4 and 5 and the sides of the notches 19 and 20 are also filled with the sealing agent 28. Thus, the main electrodes 4 and 5 are fixed to the cylindrical container 6 for fluid tightness.

The closed cylindrical container 6 is filled with an electrically conductive liquid 7 whose amount is equal to substantially one-half of an inside volume of the cylindrical container 6. The metal auxiliary electrode bar 8 extends through the upper lid 11 and is fixed so that a distal end thereof is soaked sufficiently deep in the conductive liquid 7.

When brought into contact with the conductive liquid 7, the sealing agent 28 is swollen such that there is a possibility that the adhesion may be reduced or the composition of the sealing agent 28 may be resolved into the conductive liquid 7 such that the electrical conductivity would change. Accordingly, it is desirable that a contact area of the sealing agent 28 with the conductive liquid 7 should be as small as possible. For this purpose, when the main electrodes 4 and 5 are fitted in the respective openings 13 and 14, a suitable amount of sealing agent 28 is applied to the bottoms 23 and 24 of the notches so as not to be forced out, and the main electrodes are fitted in the respective openings while pressed against the respective openings. Subsequently, in order that the main electrodes 4 and 5 may securely be fixed, a sufficient amount of sealing agent 28 is applied to outer peripheral faces of the main electrodes 4 and 5 and portions near the openings adjacent to the outer peripheral faces so as to rise up.

Consequently, a portion where the sealing agent 28 is brought into contact with the conductive liquid 7 containing alcohol as a main composition is limited to one interposed in small gaps between the main electrodes 4 and 5 and the closed container 6. Accordingly, the adhesion can be prevented from being reduced due to the swell of the sealing agent 28 or the electrical conductivity can be prevented from being reduced due to solution of the composition of the sealing agent 28 into the conductive liquid 7.

Since the electrical conductivity of the conductive liquid 7 needs to be rendered sufficiently high, an electrolyte such as lithium nitrate, potassium iodide or the like is dissolved into a solvent. A suitable solvent includes an alcohol group including methyl alcohol, ethyl alcohol and isopropyl alcohol, a ketone group including acetone and methyl ethyl ketone, an ether group including diethylene glycol monobutyl ether and the like. These solvents may be used individually or a plurality of the solvents may be combined together in use.

What solvent and electrolyte are suitable depends upon the usage of the liquid sensor. For example, when the liquid sensor is used as a seismoscope measuring a magnitude of earthquake, acceleration changes repeatedly in the positive and negative directions at a frequency of several Hz. In order that a periodically changing acceleration may be measured, the responsibility to be able to sufficiently follow the frequency is required. In addition, the sensor needs to be designed so that a resonant frequency thereof does not correspond with a frequency of earthquake. In order that these conditions may be satisfied, the conductive liquid 7 necessitates the conditions of specific gravity, viscosity, surface expansion coefficient and the like. These conditions depend mainly upon the relationship with an inner sectional form of the container 6. Accordingly, types of a solvent and electrolyte to be used are determined in view of the aforesaid requirements, a service temperature range and the like.

Additionally, an upper remaining space inside the container 6 is filled with an inert gas.

The operation of the liquid sensor 1 thus constructed will now be described. The surfaces of the main electrodes 4 and 5 facing the inside of the container are covered with the respective silicon oxide films. Since the silicon oxide films are dielectric, a parallel plate capacitor C1 and a parallel plate capacitor C2 are formed. In the capacitor C1, the main electrode 4 serves as one electrode and the conductive liquid 7 serves as the other electrode with the silicon oxide film being interposed therebetween. In the capacitor C2, the main electrode 5 serves as one electrode and the conductive liquid 7 serves as the other electrode with the silicon oxide film being interposed therebetween.

A capacitance C1 of the capacitor C1 and a capacitance C2 of the capacitor C2 are shown by the following equations:

$$C1 = \in \cdot S1/t \text{ and}$$

$$C2 = \in \cdot S2/t$$

where S1 and S2 are contact areas of the main electrodes 4 and 5 and the conductive liquid 7 respectively, t is a thickness of each silicon oxide film and $\in$ is a dielectric constant.

More specifically, the values of capacitances C1 and C2 of the capacitors C1 and C2 are calculated from the contact areas S1 and S2 of the main electrodes 4 and 5 and the conductive liquid 7. Conversely, the contact areas S1 and S2 of the main electrodes 4 and 5 and the conductive liquid 7 can be obtained by calculation when the values of the capacitances C1 and C2 are known.

Using the above relationship, the case where the liquid sensor 1 of the embodiment is used as a tilt sensor will be described. Consider now the case where the container 6 is placed so that a central axis thereof is perpendicular to the liquid surface 27 of the conductive liquid 7 as shown in FIG. 1. In this state, the contact areas S1 and S2 of the main electrodes 4 and 5 and conductive liquid 7 are equal to each other and accordingly, the values of the capacitances C1 and C2 become equal to each other.

Figure 5:
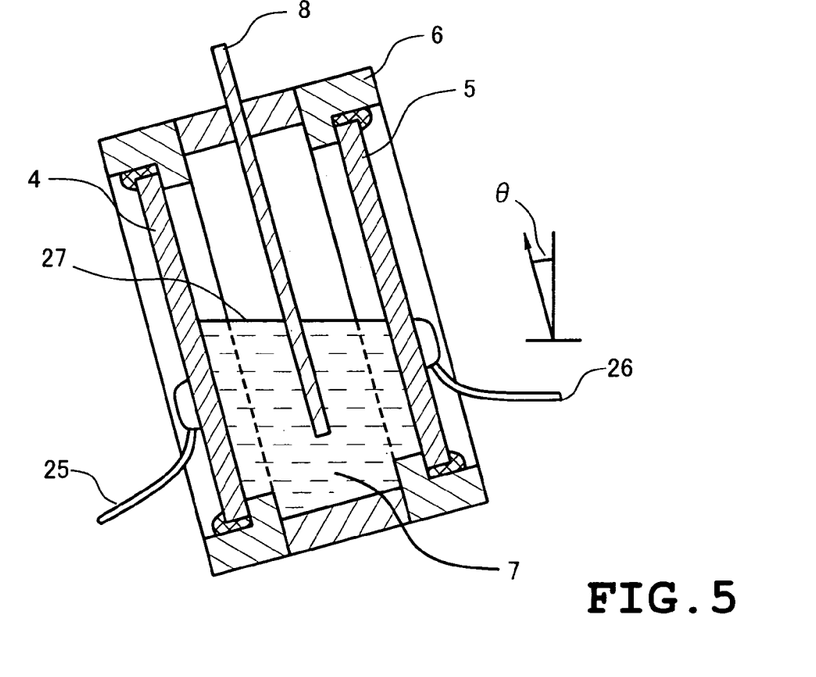
FIG. 5 is an explanatory view in the case where the liquid sensor in accordance with the first embodiment of the present invention is used as a tilt sensor.

Suppose now that the central axis of the cylindrical container 6 then tilts by a tilt angle θ from a vertical axis along the line perpendicular to the surfaces of the main electrodes 4 and 5 as shown in FIG. 5. The contact area S1 of the main electrode 4 and conductive liquid 7 is increased and accordingly, the value of the capacitance C1 is increased. On the contrary, the contact area S2 of the main electrode 5 and conductive liquid 7 is decreased and accordingly, the value of the capacitance C2 is decreased. There is a constant relationship between the difference between the contact areas S1 and S2 and the tilt angle θ. The relationship depends upon a configuration of the transverse section of the cylindrical container 6. Accordingly, when the difference between the capacitances C1 and C2 is measured and the difference between the contact areas S1 and S2, the value of tilt angle θ can be obtained by calculation using the relational equations.

Figure 6:
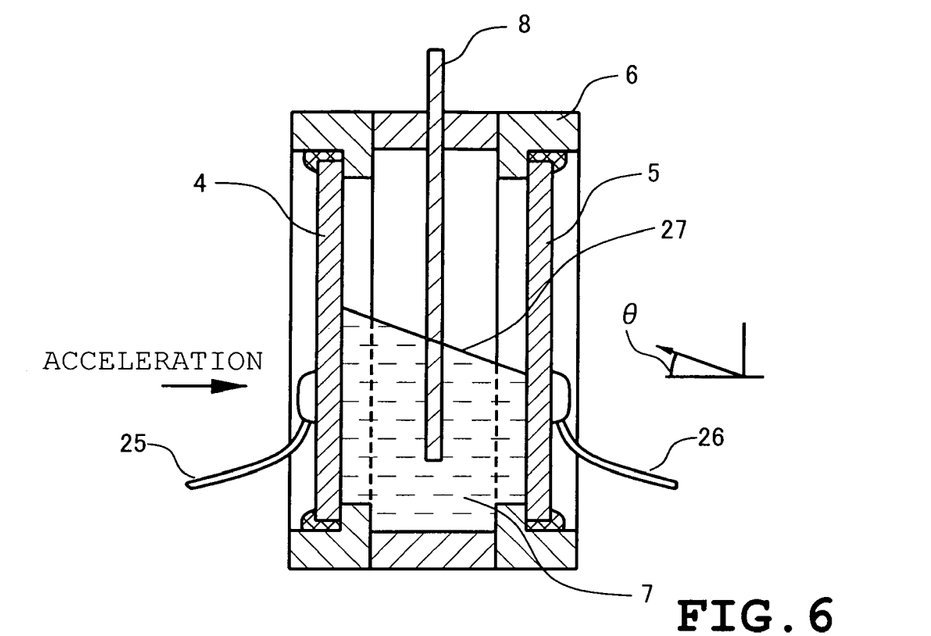
FIG. 6 is an explanatory view in the case where the liquid sensor in accordance with the first embodiment of the present invention is used as an acceleration sensor.

Next, a case where the liquid sensor 1 of the embodiment is used as an acceleration sensor will be described. The cylindrical container 6 is fixed to a horizontal substance so that the central axis becomes vertical in the same manner as shown in FIG. 1. Suppose now that a horizontal acceleration is applied in the direction perpendicular to the surfaces of the main electrodes 4 and 5 as shown in FIG. 6. If the cylindrical container 6 is not inclined, the conductive liquid 7 in the container 6 is brought up to the side opposite to the direction of acceleration by inertia, whereupon the liquid surface 27 tilts by the tilt angle .theta. from the horizontal position. As a result, the difference arises between the capacitances C1 and C2 as in the use as the tilt sensor. The difference is measured and accordingly, the tilt angle .theta. can be obtained. When the tilt angle .theta. is obtained, the magnitude of acceleration applied to the container 6 can be obtained by calculation or using a previously obtained calibration curve. As the result of the above-described operation, the liquid sensor 1 can be used as the acceleration sensor. Since a seismoscope is one type of the acceleration sensor, the liquid sensor 1 can be used as the seismoscope.

Figure 7:
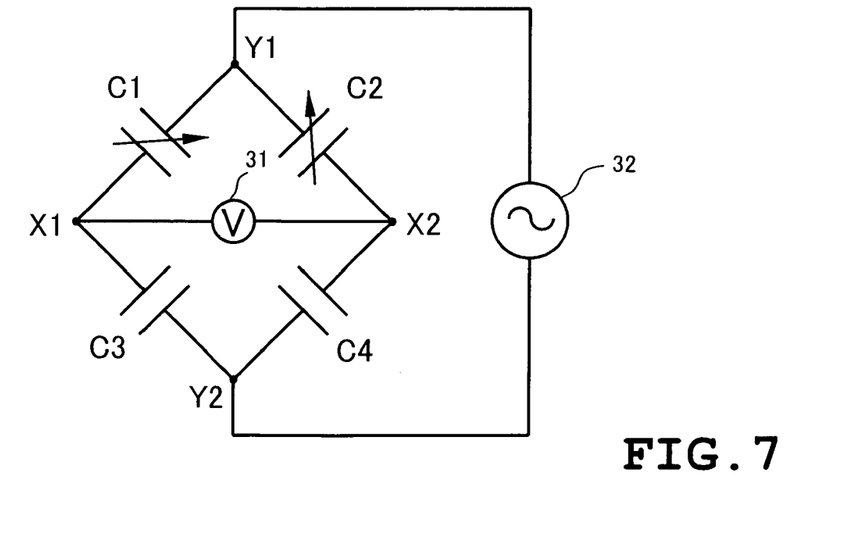
FIG. 7 is an example of an AC bridge circuit converting into voltage the difference of capacitance of a capacitor on the main electrode surface.

The following describes a method of detecting the difference between the capacitances C1 and C2 of the capcitors C1 and C2 formed on the surfaces of the main electrodes 4 and 5 respectively. FIG. 7 shows an AC bridge circuit converting the difference between the capacitances C1 and C2 to a voltage change, thereby measuring the difference. Capacitors C3 and C4 in the figure are fixed capacitors having respective capacitances equal to each other. A connecting point Y1 of the capacitors C1 and C2 corresponds to the conductive liquid 7, and connecting points X1 and X2 correspond to the lead wires 25 and 26 connected to outer surfaces of the main electrodes 4 and 5. The potential of the conductive liquid 7 is taken out by the auxiliary electrode bar 8.

A voltmeter 31 having a high internal impedance is connected between a connecting point X1 of the serially connected capacitors C1 and C3 and a connecting point X2 of the serially connected capacitors C2 and C4. An AC voltage source 32 is connected between a connecting point Y2 of the capacitors C3 and C4 and the connecting point Y1. The conductance of the conductive liquid 7 is adjusted so that a resistance value of the conductive liquid 7 is rendered sufficiently lower than impedances of the capacitors C1 and C2. Accordingly, the resistance value of the conductive liquid 7 can be ignored.

When an AC voltage is applied to the connecting points Y1 and Y2 by the AC voltage source 32 and the difference between the capacitances of the capacitors C1 and C2 is small, the voltmeter 31 indicates voltage substantially proportional to the difference of capacitances of the capacitors C1 and C2. Accordingly, the difference of capacitances of the capacitors C1 and C2 can be known by measuring the aforesaid voltage. When the difference of capacitances has been obtained, a tilt angle of the liquid sensor 1 or an acceleration applied to the liquid sensor 1 can be obtained from the value of capacitance difference. The capacitance difference can be measured even when the capacitors C3 and C4 of the AC bridge circuit in FIG. 7 are replaced by fixed resistances.

Second Embodiment

Figure 8:
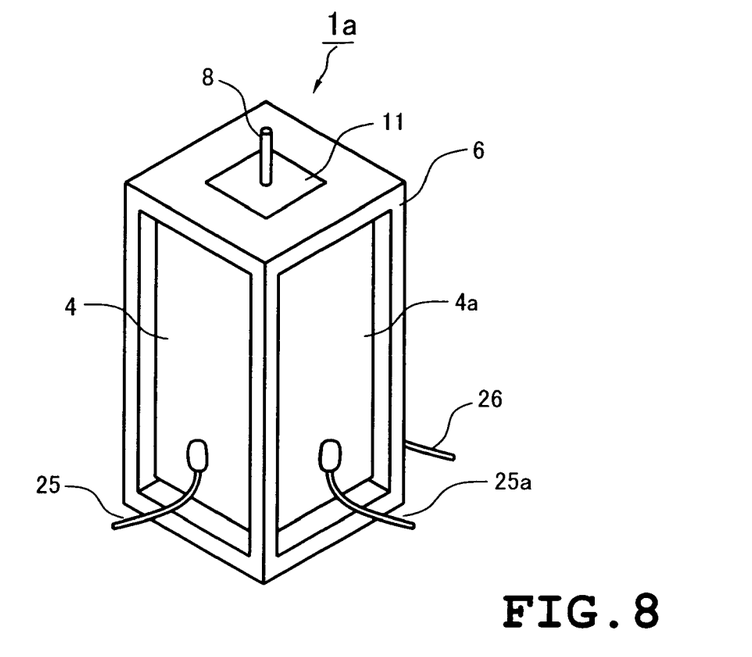
FIG. 8 is a perspective view of the liquid sensor in accordance with a second embodiment of the present invention.
Figure 9:
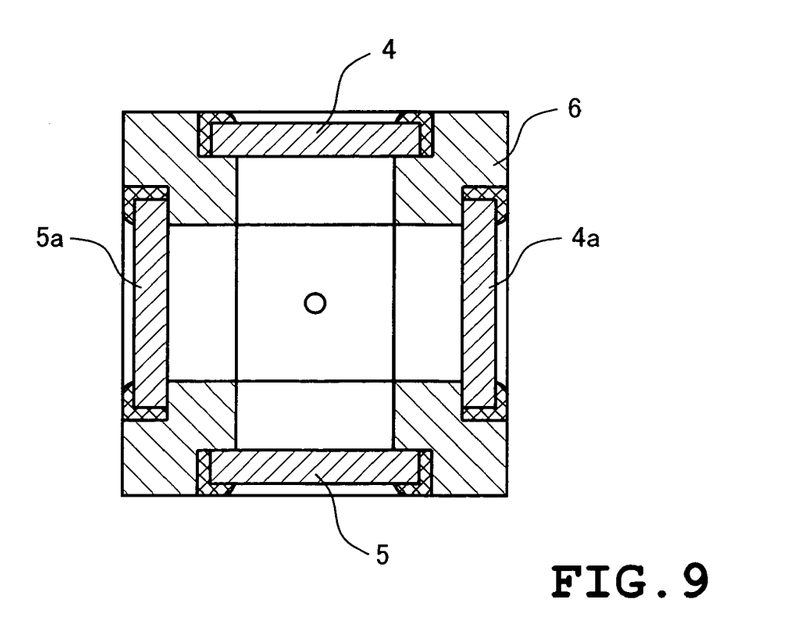
FIG. 9 is a transverse section of the liquid sensor in accordance with the second embodiment of the present invention.

The liquid sensor of the first embodiment can only measure a tilt angle or acceleration along the line perpendicular to the surfaces of the paired main electrodes. However, a liquid sensor of a second embodiment can measure a tilt angle or acceleration along two directions intersecting each other in a horizontal face. FIG. 8 is a perspective view of the liquid sensor 1a of the second embodiment and FIG. 9 is a transverse section of the liquid sensor. Identical or similar parts of the liquid sensor 1a are labeled by the same reference symbols as those of the liquid sensor 1.

The liquid sensor 1a of the second embodiment includes the cylindrical container 6 formed into a square cylindrical shape. Four plate-shaped main electrodes (4, 5, 4a, 5a) have four sides on which silicon oxide films are mounted, respectively, in a same manner as in the first embodiment. The liquid sensor 1a differs from the liquid sensor 1 of the first embodiment in that plate-shaped electrodes 4a and 5a are additionally provided and is the same as the liquid sensor 1 of the first embodiment in the other respects. A mounting structure for mounting the plate-shaped electrodes 4, 5, 4a and 5a is the same as that in the first embodiment.

The plate-shaped electrodes 4, 5, 4a, 5a are disposed as described above such that a tilt angle or angular speed can be measured along a line perpendicular to the surfaces of the electrodes 4 and 5 simultaneously with the tilt angle or angular speed along the line perpendicular to the surfaces of the main electrodes 4 and 5. More specifically, a tilt angle and an acceleration along two directions intersecting each other in the horizontal face can be measured simultaneously. Accordingly, the tilt angles or accelerations of the two directions simultaneously as described above are synthesized in the vector manner and accordingly, a direction of maximum tilt angle or the direction of acceleration on a two-dimensional surface and the magnitude values can be obtained.

Modified Forms of the First and Second Embodiments

The liquid sensors 1 and 1a of the first and second embodiments may be modified as follows. For example, when the plate-shaped main electrodes 4 and 5 are fitted in the openings of the sides of the container, the gaps in the abutting portions of the main electrodes 4 and 5 and the notches 19 and 20 are filled with the sealing agent 28, as shown in FIG. 4. Further, the gaps between the outer peripheral faces of the main electrodes 4 and 5 and the sides of the notches 19 and 20 are also filled with the sealing agent 28. Thus, the main electrodes 4 and 5 are fixed to the cylindrical container 6 for fluid tightness.

Figure 10:
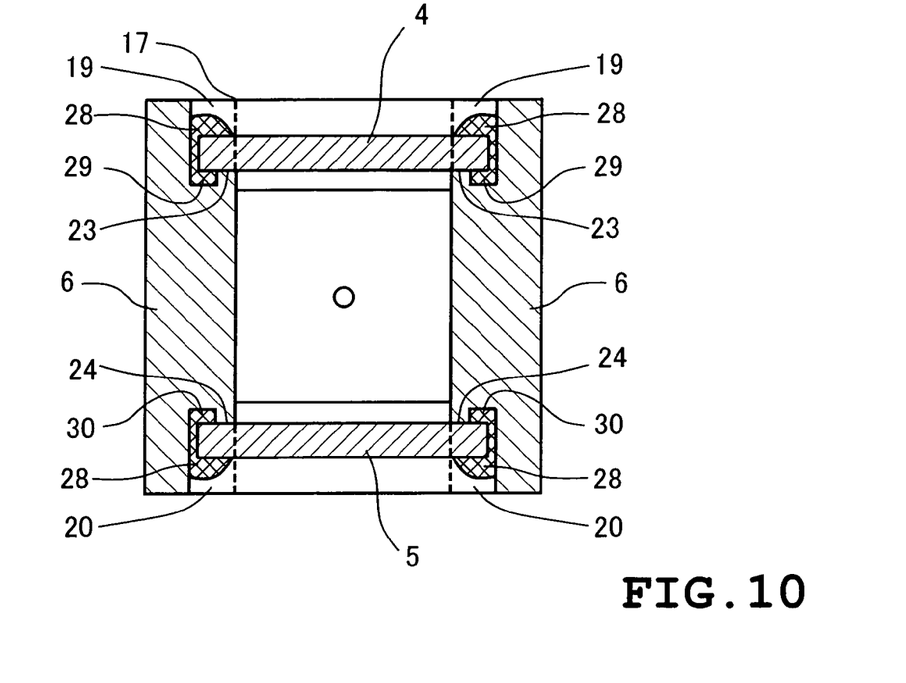
FIG. 10 is a transverse section showing another embodiment of a manner of mounting a main electrode to a cylindrical container.

In order that the fixing and the fluid tightness may be rendered more reliable, as shown in FIG. 10, recess-shaped, U-shaped and V-shaped grooves 29 and 30 are formed, and spaces defined by the grooves 29 and 30 and the main electrodes 4 and 5 are filled with the sealing agent 28 for fluid tightness. As a result, since the main electrodes 4 and 5 are fixed to the cylindrical container 6 by the peripheral three sides, the fixation can be intensified and a liquid-leak preventing effect can be improved.

Further, the metal electrode bar 8 serving as an auxiliary electrode extends through the upper lid 11 and is fixed so that a distal end thereof is soaked sufficiently deep in the conductive liquid 7. Instead of taking out the potential of the conductive liquid 7 in this way, an entire or a part of the lower lid 12 may be made of an electrically conductive material thereby to serve as an auxiliary electrode and a lead wire may be connected to the auxiliary electrode so that the potential of the conductive liquid 7 is taken out.

Further, the plate-shaped main electrodes 4 and 5 fitted in the notches 19 and 20 may have respective outer faces the entire of each of which is covered with a sealing agent. Consequently, the outer faces of the main electrodes 4 and 5 can be protected.

Third Embodiment

Figure 11:
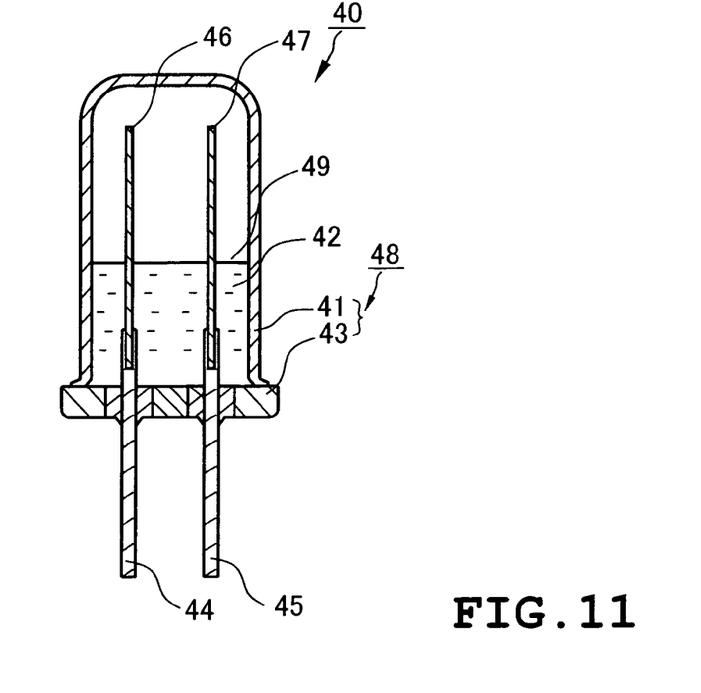
FIG. 11 is a longitudinal section of the liquid sensor in accordance with a third embodiment of the present invention.
Figure 12:
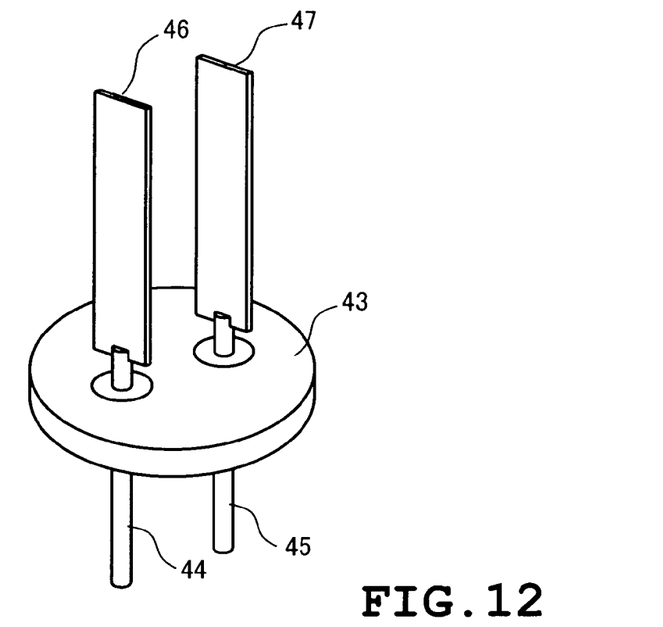
FIG. 12 is a perspective view showing arrangement of electrodes in the container of the liquid sensor in accordance with the third embodiment of the present invention.

A third embodiment of the present invention will be described with reference to the drawings. FIG. 11 is a longitudinal section of the liquid sensor of the embodiment, and FIG. 12 is a perspective view showing arrangement of electrodes in the container of the liquid sensor.

The liquid sensor 40 of the embodiment has a pair of main electrodes and comprises a container 41, an electrically conductive liquid 42, a disc 43, first and second lead terminals 44 and 45 and first and second main electrodes 46 and 47.

The container 41 is a substantially circularly cylindrical container with a closed end and is made of an electrically conductive material. A corrosion-resistant metal such as stainless steel is used as the conductive material. An opening of the container 41 is closed by the disc 43.

The closed container 48 comprising the container 41 and the disc 43 is filled with an electrically conductive liquid 42 whose amount is equal to substantially one-half of an inside volume of the container. The conductive liquid 42 is the same as described in the first embodiment. The upper inner space of the closed container 48 is filled with the inert gas.

The first and second lead terminals 44 and 55 extend through the disc 43 and are fixed while being electrically insulated from the disc. The lead terminals 44 and 55 have distal ends which protrude into the closed container 48 and to which the first and second main electrodes 46 and 47 are mounted. The surfaces of portions of the lead terminals 44 and 55 protruding into the container 48 are covered with an insulating resin so as not to come into electrical contact with the conductive liquid 42. Connecting portions of the lead terminals 44 and 55 and the main electrodes 46 and 47 are also covered with the insulating resin in the same way thereby to be protected.

The main electrodes 46 and 47 are formed into the same shape of a short strip. The shape is selected so that a surface area of each electrode is increased so that the capacitance is increased and accordingly an amount of change in the capacitance is rendered easier. The main electrodes 46 and 47 are mounted so that short strip-shaped sides of them confront each other and so that main electrode sides are parallel to each other, that is, mounted oppositely so that an imaginary line connecting the two lead terminals 44 and 55 is perpendicular to the sides of the respective main electrodes 46 and 47. When the closed container 48 is in a vertical state, an upper one-third to one-half part of each of the main electrodes 46 and 47 is exposed over the surface of the conductive liquid 42.

Each of the main electrodes 46 and 47 is made from an electrically conductive material and has a surface formed with a thin silicon oxide film. A parallel plate capacitor is formed and has one of the main electrodes and the conductive electrode 2 serving as the other electrode with the thin silicon oxide film as a dielectric being interposed between the electrodes. Since each main electrode has a surface formed with the silicon oxide film, a silicon material such as single crystal silicon, amorphous silicon, polycrystalline silicon or the like is used as in the first embodiment. The silicon oxide film is also formed by an ordinary method used in the IC production process, such as the thermal oxidation process, CVD process or the like as in the first embodiment.

Figure 13:
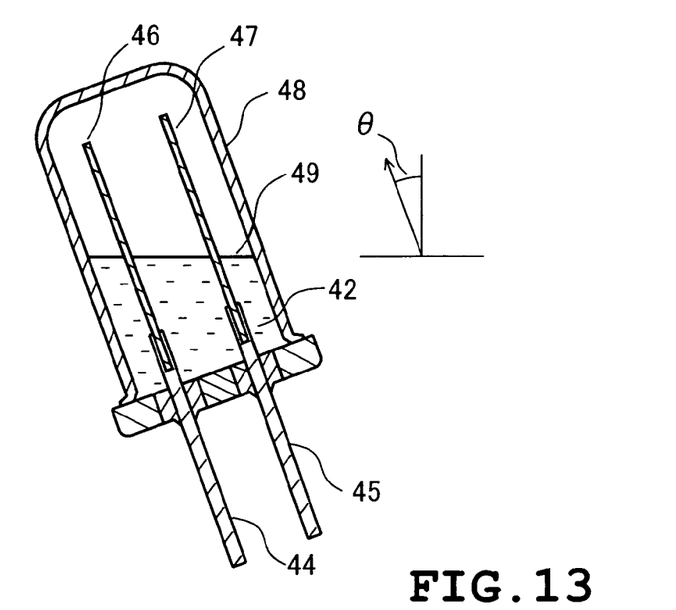
FIG. 13 is an explanatory view in the case where the liquid sensor in accordance with the third embodiment of the present invention is used as a tilt sensor.

The liquid sensor 40 of the embodiment can also be used as a tilt sensor, acceleration sensor and seismoscope as the liquid sensor 1 of the first embodiment. FIG. 13 shows the case where the liquid sensor 40 is used as a tilt sensor. A contact area of the main electrode 46 with the conductive liquid 42 is increased when the closed container 48 tilts by a tilt angle $\theta$ from the vertical axis along an imaginary line connecting the lead terminals 44 and 55. Consequently, the capacitance of the capacitor comprising the main electrode 46, silicon oxide film and conductive liquid 42 is increased. Conversely, the capacitance of the capacitor comprising the main electrode 47, silicon oxide film and conductive liquid 42 is decreased. Accordingly, as described in the first embodiment, the value of tilt angle $\theta$ can be obtained when the difference of capacitance is measured by the bridge circuit as shown in FIG. 7. In this case, the potential of the conductive liquid 42 is taken from the closed container 48 made from the conductive material.

Figure 14:
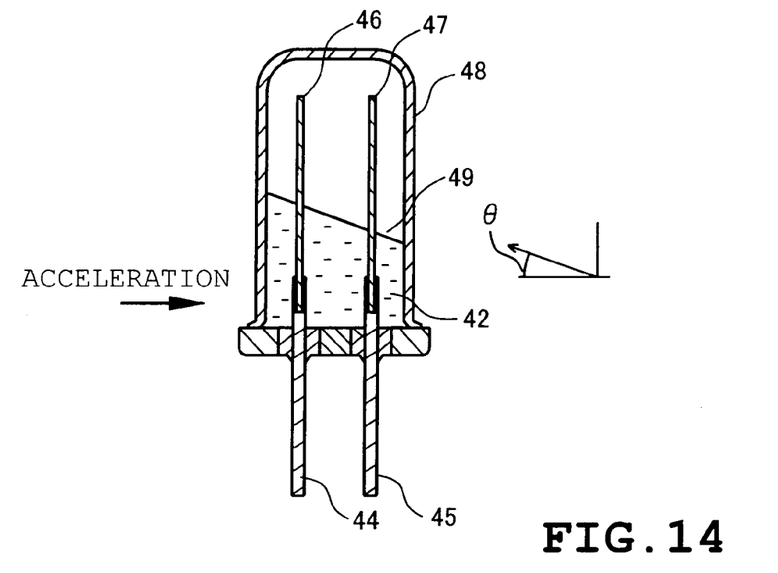
FIG. 14 is an explanatory view in the case where the liquid sensor in accordance with the third embodiment of the present invention is used as an acceleration sensor.

FIG. 14 shows the case where the liquid sensor 40 is used as an acceleration sensor. In this case, too, the capacitance of the capacitor comprising the main electrode 46, silicon oxide film and conductive liquid 42 is increased, as in the case of FIG. 6 in the first embodiment. Conversely, the capacitance of the capacitor comprising the main electrode 47, silicon oxide film and conductive liquid 42 is decreased. Accordingly, the magnitude of acceleration applied to the closed container 48 can be obtained when the difference of capacitance is measured.

Fourth Embodiment

The liquid sensor 40 of the third embodiment can only measure a tilt angle or acceleration along the line perpendicular to the surfaces of the paired main electrodes. However, a liquid sensor of a fourth embodiment is expanded so as to be able to measure a tilt angle or acceleration along two directions intersecting each other in a horizontal face.

Figure 15:
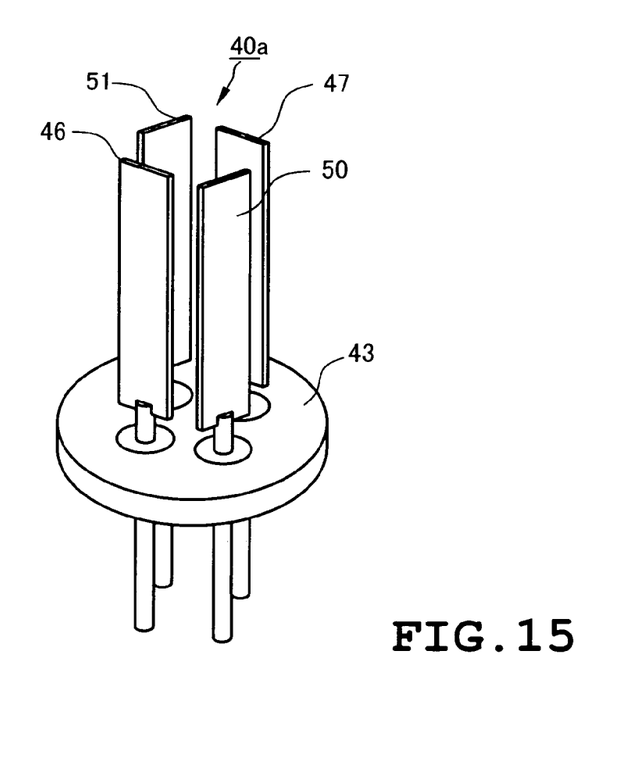
FIG. 15 is a perspective view showing arrangement of electrodes in the container of the liquid sensor in accordance with a fourth embodiment of the present invention.

FIG. 15 is a perspective view of the liquid sensor 40a of the fourth embodiment, showing the arrangement of the main electrodes in the container. The liquid sensor 40a is provided with an additional pair of main electrodes 50 and 51 in the closed container 48. Four main electrodes 46, 47, 50 and 51 are mounted so that the surfaces of each electrode and an adjacent one meet each other at right angles, that is, so that an imaginary line connecting the lead terminals of each pair intersect each other and is perpendicular to the sides of the main electrodes mounted to the respective lead terminals.

According to the above-described construction, the liquid sensor can measure a tilt angle or acceleration along a line perpendicular to the surfaces of the main electrodes 50 and 51 simultaneously with the tilt angle or acceleration along a line perpendicular to the surfaces of the main electrodes 46 and 47. More specifically, tilt angles or accelerations along two directions intersecting each other in the horizontal face can be measured simultaneously. Accordingly, the two tilt angles or two accelerations obtained simultaneously as described above are synthesized in the vector manner and accordingly, a direction of maximum tilt angle or the direction of acceleration on a two-dimensional surface and the magnitude values can be obtained.

Modified Forms of the Third and Fourth Embodiments

Figure 16:
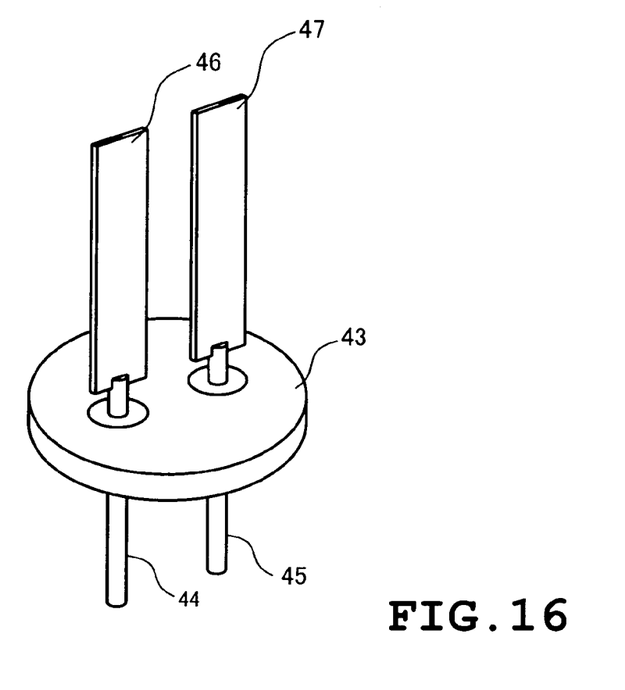
FIG. 16 is a perspective view showing another embodiment of the electrode arrangement in the liquid sensor in accordance with the third embodiment of the present invention.
Figure 17:
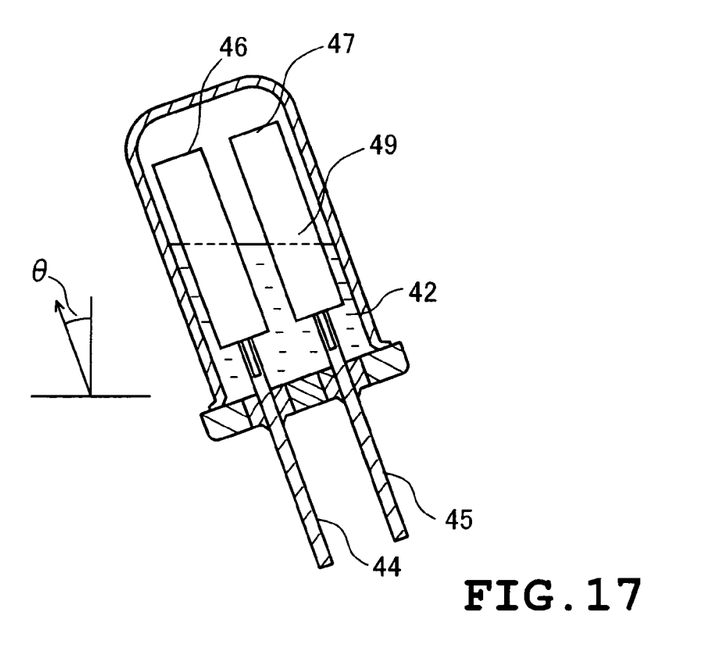
FIG. 17 is an explanatory view in the case where the liquid sensor having the electrode arrangement as shown in FIG. 16 is used as an acceleration sensor.

The liquid sensors 40 and 40a of the third and fourth embodiments may be modified as follows. For example, in the case of the liquid sensor 40 of the third embodiment, the main electrodes 46 and 47 may be mounted so that the surfaces of them are co-planar as shown in FIG. 16. In this structure, too, when the closed container 48 tilts, a contact area of each main electrode with the conductive electrode 42 changes such that a difference of capacitance arises as shown in FIG. 17. Accordingly, a tilt angle of the closed container 48 can be obtained by measuring the difference. An acceleration can also be obtained in the same manner.

Figure 18:
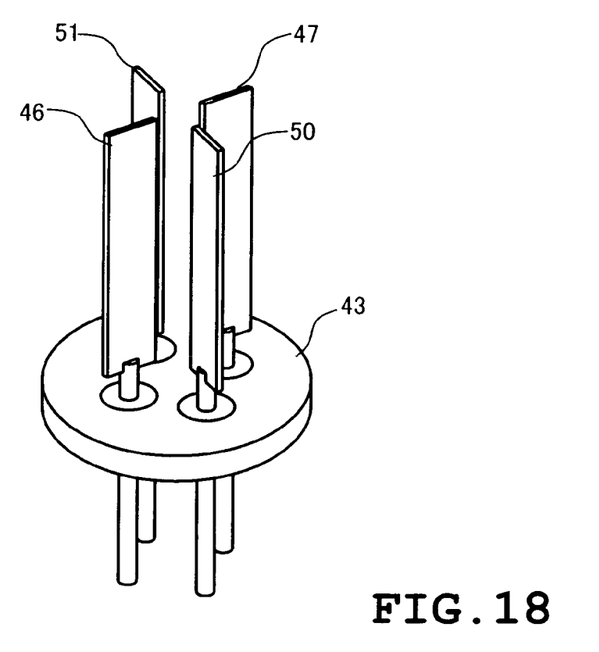
FIG. 18 is a perspective view showing another embodiment of the electrode arrangement in the liquid sensor in accordance with the fourth embodiment of the present invention.

Further, in the fourth embodiment, the two pairs of main electrodes may be mounted so that the surfaces of the four main electrodes 46, 47, 50 and 51 adjacent to one another disposed radially while meeting each other at angles of 90° as shown in FIG. 18. Consequently, as in the fourth embodiment, a tilt angle or acceleration can be measured along two lines connecting the paired main electrodes. Further, this structure has an effect that each main electrode limits an unfavorable rotational motion of the conductive liquid 42 in the closed container 48.

Figure 19:
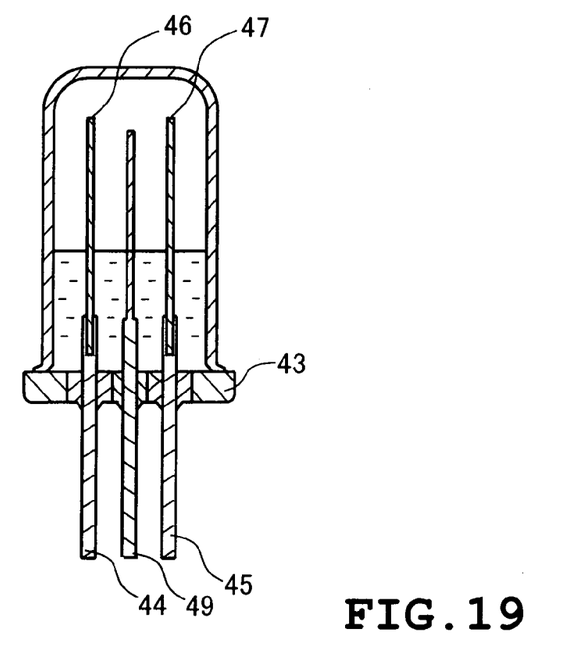
FIG. 19 is a longitudinal section in the case where the liquid sensor in accordance with the third and fourth embodiments is provided with an auxiliary electrode extending through the lower disc.

Further, in the third and fourth embodiments, the potential of the conductive liquid 42 is taken out from the closed container 48 made from the conductive material in the third and fourth embodiments. As shown in FIG. 19, however, an electrically conductive auxiliary electrode 52 may be mounted so as to extend through the disc 43 closing the opening in order to take out the potential.

Further, the liquid sensors 40 and 40a are used with the discs 3 being located at the bottom thereof in the third and fourth embodiments. However, the liquid sensors may be used upside down or while the discs 3 are located at the top and the closed containers 48 are located at the bottom.

Other Modified Forms

In the hitherto described first to fourth embodiments, two opposed main electrodes are parallel to each other. However, the main electrodes need not be parallel to each other so long as the difference of capacitance between the opposed electrodes can be detected by the bridge circuit. Additionally, the surface of each main electrode need not be flat. For example, each main electrode may be bar-shaped in the third and fourth embodiments. Further, in the first and second embodiments, in order that the capacitance may be increased by increasing the contact area with the conductive liquid, each main electrode protruding into the conductive liquid may have a triangular or semicircular section.

Further, the electrodes a repaired in the hither to described embodiments. However, a single main electrode may be provided. For example, a single main electrode is disposed at a position shifted from the center of the closed container. In this case, an immersion depth of each main electrode changes upon changes in the liquid surface of the conductive liquid, whereupon the capacitance between each main electrode and the conductive liquid changes. A tilt or acceleration applied to the closed container can be detected by measuring the aforesaid changes in the capacitance. In this case, the value of capacitance can be measured when a capacitor comprising the main electrodes, silicon oxide films and conductive liquid is connected to a side of a bridge circuit.

INDUSTRIAL APPLICABILITY

As described above, the liquid sensor in accordance with the present invention is suitable for use as a sensor detecting a tilt angle of an object or a direction and magnitude of acceleration applied to an object in the horizontal direction. The liquid sensor is further suitable for use as a seismoscope.

The invention claimed is:

1. A liquid sensor comprising:
a container filled with an electrically conductive liquid;
an electrode including a part having a surface formed with a dielectric film, the electrode being brought into contact with the conductive liquid so that a change in a contact area of the electrode with the conductive liquid with movement of a surface of the conductive liquid is measured from a change in a capacitance between the electrode and the conductive liquid and so that a change in a tilt angle of the electrode to the liquid surface or an acceleration applied to the container is detected from a measured value, wherein the dielectric film comprises a silicon oxide film.

2. A capacitance type liquid sensor comprising:
a cylindrical closed container made from an electrically insulating material and having two sides parallel to each other, the sides having respective openings formed therein, the container being filled with a conductive liquid;
a plurality of plate-shaped main electrodes each having at least one side formed with a silicon oxide film, the main electrodes being in abutment with said sides while the silicon oxide films face an inside of the container, thereby closing the openings;
a sealing agent interposed in a gap between the main electrodes and said sides for fluid tightness respectively; and
an auxiliary electrode provided in the container to be brought into electrical contact with the conductive liquid, wherein the conductive liquid has an amount corresponding to substantially one half of a content volume of the container.

3. A capacitance type liquid sensor comprising:
a cylindrical closed container made from an electrical insulator and having two sides parallel to each other and upper and lower openings closed by lids respectively, said sides having vertically extending rectangular openings formed in the sides;
a plurality of notches formed by cutting out corners located outside the container with respect to all end faces of the openings so that plate-shaped members are capable of being fitted in the notches;

a plurality of plate-shaped electrodes having at least one side formed with silicon oxide films and fitted in the notches so as to abut against bottoms of the notches with the oxide films facing an inside of the container;

a sealing agent provided for fluid tightness in gaps defined between the bottoms of the notches and the plate-shaped electrodes and gaps defined between outer peripheral sides of the plate-shaped electrodes and sides of the notches;

an electrically conductive liquid having an amount equal to substantially one-half of an inside volume of the container and filling the container; and an auxiliary electrode bar made from a metal and extending through substantially a central part of the upper lid so that a distal end thereof is immersed sufficiently deep in the conductive liquid.

4. The capacitance type liquid sensor according to claim 2, wherein the cylindrical container is formed into a square cylindrical shape and has two pairs of parallel sides, the four parallel sides having openings closed by plate-shaped main electrodes having silicon oxide films respectively.

5. The capacitance type liquid sensor according to claim 3, wherein the cylindrical container is formed into a square cylindrical shape and has two pairs of parallel sides, the four parallel sides having openings closed by plate-shaped main electrodes having silicon oxide films respectively.

6. The capacitance type liquid sensor according to claim 3, wherein the bottoms of the notches are formed with grooves respectively and the sealing agent fills for fluid tightness spaces defined between the grooves and the plate-shaped main electrodes respectively.

7. The capacitance type liquid sensor according to claim 3, wherein an entire or a part of the lower lid is made from an electrically conductive material to serve as an auxiliary electrode, instead of the auxiliary electrode.

8. The capacitance type liquid sensor according to claim 2, wherein an entire side of the plate-shaped main electrode facing an outside of the container is covered with a sealing agent.

9. The capacitance type liquid sensor according to claim 2, wherein the sealing agent comprises a glass having a low melting point.

10. A capacitance type liquid sensor comprising:
a closed container;
an electrically conductive liquid having an amount equal to substantially one-half of an inside volume of the container and filling the container;
a pair of lead terminals extending through one of ends of the container and fixed to the container so as to be electrically insulated from the container;
a plurality of main electrodes having surfaces formed with silicon oxide films and mounted on distal ends of the lead terminals, respectively, the main electrodes being provided so that parts of the main electrodes are located on a liquid surface of the conductive liquid when the container is stationary; and
an auxiliary electrode electrically conductively brought into contact with the conductive liquid.

11. The capacitance type liquid sensor according to claim 10, wherein two pairs of the lead terminals extend through said one end of the container and are fixed to the container, instead of one pair, the main electrodes are mounted on distal ends of the lead terminals respectively, and imaginary lines connecting centers of the respective paired main electrodes intersect perpendicularly to each other.

12. The capacitance type liquid sensor according to claim 10, wherein the main electrodes are formed into a shape of a short strip and two main electrode sides of each pair are opposed to each other so that imaginary lines connecting centers of the respective paired main electrodes are perpendicular to the sides of the respective paired main electrodes.

13. The capacitance type liquid sensor according to claim 10, wherein the main electrodes are formed into a shape of a short strip and are disposed radially so that angles made by the surfaces of the main electrodes adjacent to each other are equal to each other.

14. The capacitance type liquid sensor according to claim 10, wherein the auxiliary electrode is the closed container made from an electrically conductive material.

15. The capacitance type liquid sensor according to claim 10, wherein the auxiliary electrode extends through one of ends of the container and is fixed to the container.

16. The capacitance type liquid sensor according to claim 2, wherein each main electrode is made from any one of single crystal silicon, amorphous silicon, and polycrystalline silicon.

17. The capacitance type liquid sensor according to claim 2, wherein the conductive liquid is made from any one or a combination of two or more of an alcohol group including methyl alcohol, ethyl alcohol and isopropyl alcohol, a ketone group including acetone and methyl ethyl ketone and an ether group including diethylene glycol mono-butyl ether with addition of an electrolyte including lithium nitrate or potassium iodide.

18. The capacitance type liquid sensor according to claim 2, wherein the closed container contains an inert gas.

19. The capacitance type liquid sensor according to claim 5, wherein the bottoms of the notches are formed with grooves respectively and the sealing agent fills for fluid tightness spaces defined between the grooves and the plate-shaped main electrodes respectively.

20. The capacitance type liquid sensor according to claim 5, wherein an entire or a part of the lower lid is made from an electrically conductive material to serve as an auxiliary electrode, instead of the metal auxiliary electrode.

21. The capacitance type liquid sensor according to claim 3, wherein an entire side of the plate-shaped main electrode facing an outside of the container is covered with a sealing agent.

22. The capacitance type liquid sensor according to claim 4, wherein an entire side of the plate-shaped main electrode facing an outside of the container is covered with a sealing agent.

23. The capacitance type liquid sensor according to claim 5, wherein an entire side of the plate-shaped main electrode facing an outside of the container is covered with a sealing agent.

24. The capacitance type liquid sensor according to claim 3, wherein the sealing agent comprises a glass having a low melting point.

25. The capacitance type liquid sensor according to claim 4, wherein the sealing agent comprises a glass having a low melting point.

26. The capacitance type liquid sensor according to claim 5, wherein the sealing agent comprises a glass having a low melting point.

27. The capacitance type liquid sensor according to claim 11, wherein the main electrodes are formed into a shape of a short strip and two main electrode sides of each pair are opposed to each other so that imaginary lines connecting centers of the respective paired main electrodes are perpendicular to the sides of the respective paired main electrodes.

28. The capacitance type liquid sensor according to claim 11, wherein the main electrodes are formed into a shape of a short strip and are disposed radially so that angles made by the main electrode sides adjacent to each other are equal to each other.

29. The capacitance type liquid sensor according to claim 11, wherein the auxiliary electrode is the closed container made from an electrically conductive material.

30. The capacitance type liquid sensor according to claim 11, wherein the auxiliary electrode extends through one of ends of the container and is fixed to the container.

31. The capacitance type liquid sensor according to claim 3, wherein each main electrode is made from any one of single crystal silicon, amorphous silicon, and polycrystalline silicon.

32. The capacitance type liquid sensor according to claim 4, wherein each main electrode is made from any one of single crystal silicon, amorphous silicon, and polycrystalline silicon.

33. The capacitance type liquid sensor according to claim 5, wherein each main electrode is made from any one of single crystal silicon, amorphous silicon, and polycrystalline silicon.

34. The capacitance type liquid sensor according to claim 10, wherein each main electrode is made from any one of single crystal silicon, amorphous silicon, and polycrystalline silicon.

35. The capacitance type liquid sensor according to claim 11, wherein each main electrode is made from any one of single crystal silicon, amorphous silicon, and polycrystalline silicon.

36. The capacitance type liquid sensor according to claim 3, wherein the conductive liquid is made from any one or a combination of two or more of an alcohol group including methyl alcohol, ethyl alcohol and isopropyl alcohol, a ketone group including acetone and methyl ethyl ketone, an ether group including diethylene glycol mono-butyl ether and the like with addition of an electrolyte including lithium nitrate, potassium iodide or the like.

37. The capacitance type liquid sensor according to claim 4, wherein the conductive liquid is made from any one or a combination of two or more of an alcohol group including methyl alcohol, ethyl alcohol and isopropyl alcohol, a ketone group including acetone and methyl ethyl ketone, an ether group including diethylene glycol mono-butyl ether and the like with addition of an electrolyte including lithium nitrate, potassium iodide or the like.

38. The capacitance type liquid sensor according to claim 5, wherein the conductive liquid is made from any one or a combination of two or more of an alcohol group including methyl alcohol, ethyl alcohol and isopropyl alcohol, a ketone group including acetone and methyl ethyl ketone, an ether group including diethylene glycol mono-butyl ether and the like with addition of an electrolyte including lithium nitrate, potassium iodide or the like.

39. The capacitance type liquid sensor according to claim 10, wherein the conductive liquid is made from any one or a combination of two or more of an alcohol group including methyl alcohol, ethyl alcohol and isopropyl alcohol, a ketone group including acetone and methyl ethyl ketone, an ether group including diethylene glycol mono-butyl ether and the like with addition of an electrolyte including lithium nitrate, potassium iodide or the like.

40. The capacitance type liquid sensor according to claim 11, wherein the conductive liquid is made from any one or a combination of two or more of an alcohol group including methyl alcohol, ethyl alcohol and isopropyl alcohol, a ketone group including acetone and methyl ethyl ketone, an ether group including diethylene glycol mono-butyl ether and the like with addition of an electrolyte including lithium nitrate, potassium iodide or the like.

41. The capacitance type liquid sensor according to claim 3, wherein the closed container contains an inert gas.

42. The capacitance type liquid sensor according to claim 4, wherein the closed container contains an inert gas.

43. The capacitance type liquid sensor according to claim 5, wherein the closed container contains an inert gas.

44. The capacitance type liquid sensor according to claim 10, wherein the closed container contains an inert gas.

45. The capacitance type liquid sensor according to claim 11, wherein the closed container contains an inert gas.

* * * * *